United States Patent
Willey et al.

(10) Patent No.: US 11,839,860 B2
(45) Date of Patent: *Dec. 12, 2023

(54) ON-DEMAND IN-LINE-BLENDING AND SUPPLY OF CHEMICALS

(71) Applicant: DIVERSIFIED FLUID SOLUTIONS, LLC, Boise, ID (US)

(72) Inventors: Darren Willey, Boise, ID (US); Karl Urquhart, Boise, ID (US); Joseph Watters, Boise, ID (US); Christopher Donelson, Boise, ID (US)

(73) Assignee: DIVERSIFIED FLUID SOLUTIONS, LLC, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,088

(22) Filed: May 1, 2022

(65) Prior Publication Data

US 2022/0339591 A1 Oct. 27, 2022

Related U.S. Application Data

(63) Continuation of application No. 17/299,927, filed as application No. PCT/US2020/062458 on Nov. 26, 2020, now Pat. No. 11,318,431.

(Continued)

(51) Int. Cl.
*B01F 35/00* (2022.01)
*B01F 35/22* (2022.01)
(Continued)

(52) U.S. Cl.
CPC ........ *B01F 35/2209* (2022.01); *B01F 25/311* (2022.01); *B01F 25/4331* (2022.01); *B01F 35/2202* (2022.01); *B01F 35/2203* (2022.01); *B01F 35/2213* (2022.01); *B01F 35/883* (2022.01); *B01F 35/90* (2022.01);
(Continued)

(58) Field of Classification Search
CPC ........ B01F 25/4331; B01F 35/2209; B01F 35/883; B01F 35/2213; B01F 35/2203; B01F 25/311; B01F 35/90; B01F 35/2202; B01F 2101/58; B01F 2035/99; B01F 2025/916; B24B 57/02
See application file for complete search history.

(56) References Cited

U.S. PATENT DOCUMENTS

| 11,318,431 B2* | 5/2022 | Willey .................. B24B 57/02 |
| 2007/0070803 A1* | 3/2007 | Urquhart ............ B01F 35/2132 366/152.4 |

(Continued)

*Primary Examiner* — Anshu Bhatia
(74) *Attorney, Agent, or Firm* — HODGSON RUSS LLP

(57) ABSTRACT

This in-line active and reverse calculating mass balance blending system can maintain a chemical at desired control points, such as with respect to concentration, temperature, and/or pressure, while the output flow rate is changing dynamically to a point of use. A blending unit is configured to receive and blend at least two species and deliver a mixture at selected concentrations to points of use. A controller can be configured to determine a mass balance to maintain the concentrations in the mixture using information from metrology systems and a flow in an output to the at least one point of use. The controller also can be configured to maintain a concentration in the mixture within a concentration range by controlling flow rates to the blending unit.

20 Claims, 14 Drawing Sheets

Related U.S. Application Data

(60) Provisional application No. 62/941,152, filed on Nov. 27, 2019.

(51) Int. Cl.
  *B01F 25/433* (2022.01)
  *B01F 35/88* (2022.01)
  *B01F 35/221* (2022.01)
  *B01F 25/31* (2022.01)
  *B01F 35/90* (2022.01)
  *B24B 57/02* (2006.01)
  *B01F 101/58* (2022.01)
  *B01F 25/00* (2022.01)

(52) U.S. Cl.
  CPC ........ *B24B 57/02* (2013.01); *B01F 2025/916* (2022.01); *B01F 2035/99* (2022.01); *B01F 2101/58* (2022.01)

(56) References Cited

U.S. PATENT DOCUMENTS

2007/0106425 A1* 5/2007 Anderson ............ B01F 35/213
  700/285
2013/0028043 A1 1/2013 Fanjat et al.

* cited by examiner

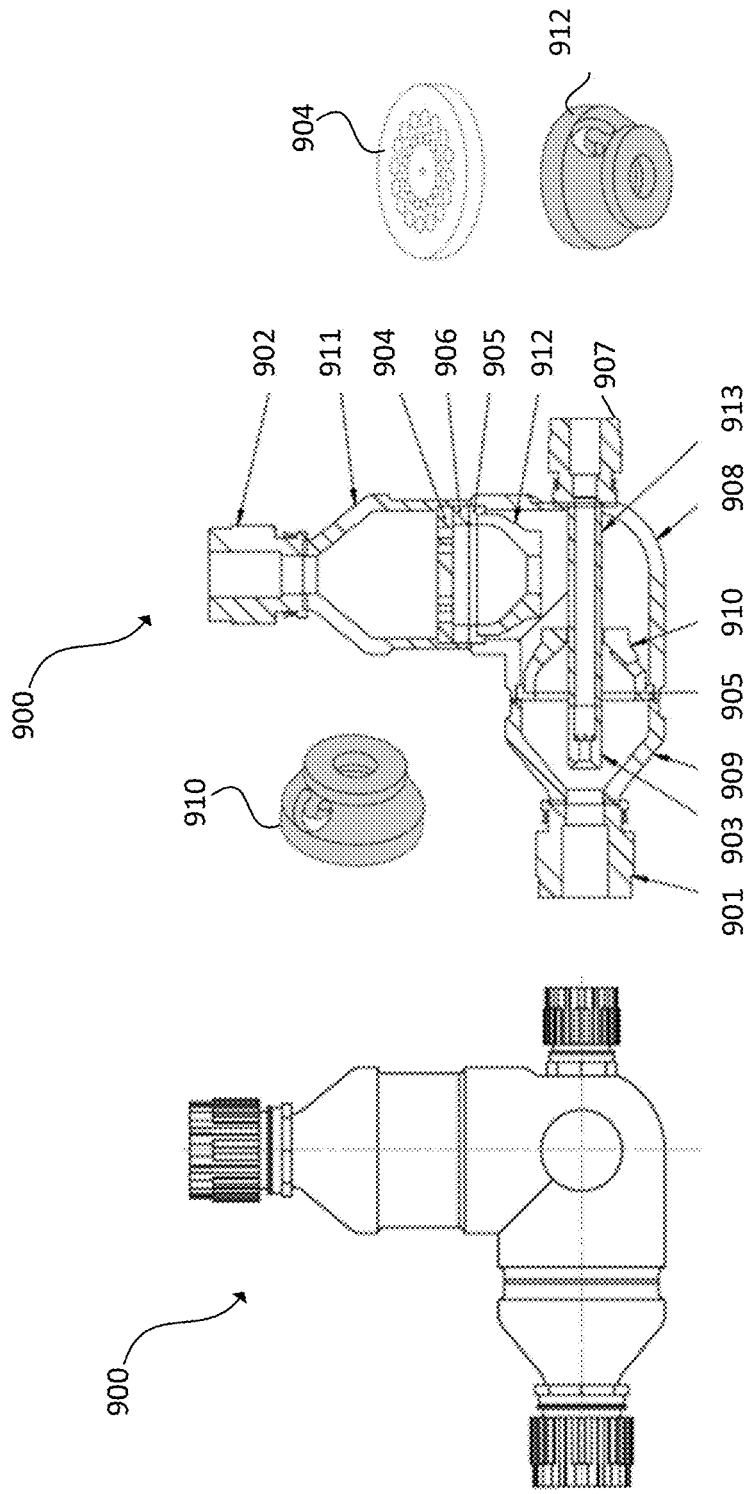

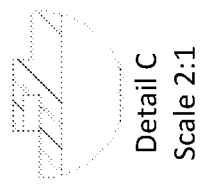
Section A-A
FIG. 10C
FIG. 10B
FIG. 10E
Detail C
Scale 2:1
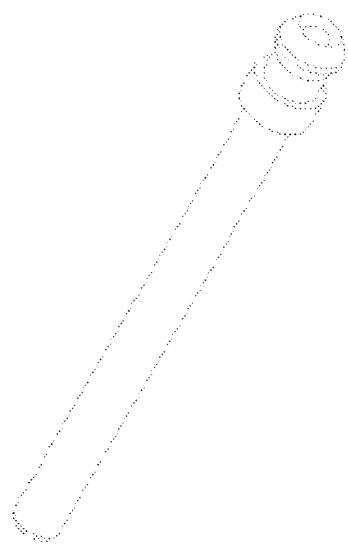
FIG. 10A
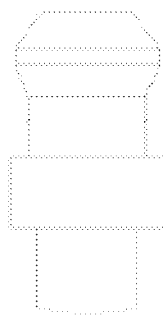
FIG. 10D

ON-DEMAND IN-LINE-BLENDING AND SUPPLY OF CHEMICALS

CROSS-REFERENCE TO RELATED APPLICATIONS

This application is a continuation of U.S. application Ser. No. 17/299,927 filed Jun. 4, 2021, which is a national stage application of PCT/US2020/062458 filed Nov. 26, 2020, which claims priority to the provisional patent application U.S. App. No. 62/941,152 filed Nov. 27, 2019, the disclosures of which are hereby incorporated by reference.

FIELD OF THE DISCLOSURE

This disclosure relates to combining fluids to form a chemical mixture.

BACKGROUND OF THE DISCLOSURE

Many industrial processes and commercial products combine two or more fluids (liquids or gases) together to form a defined mixture. Batch blending is the process of chemical blending where the chemical constituents are added independently and mixed in a tank before being made available for use. Continuous (in-line) blending is the process of chemical blending where the chemical constituents are combined in-line within a conduit while flowing to points of use and are immediately available for use at the points of use. Semi-batch blending is the process of chemical blending where the chemical constituents are combined in-line and then held in a tank/vessel for dispense at a later time. Semi-batch blending allows for blended batch composition qualification prior to the release for consumption or use. Semi-batching is the most common embodiment used in the blending technology sectors of industry.

Typically, combining fluids is performed in discrete batches. In such a batch process, a quantity of the first fluid is added, followed by a quantity of the second fluid. These two fluids are mechanically mixed, and the resulting mixture is sampled. If necessary, additional quantities of either the first or the second fluid can be further added to refine the composition of the mixture. Once the desired composition is achieved, the batch is released for use, transferred to an intermediate vessel, or transferred directly to the end user. This type of batching or blending process is common to many industrial segments including semiconductor processing, pharmaceutical products, biomedical products, food-processing products, household products, personal care products, petroleum products, chemical products, and other general industrial liquid products.

Batch processing, or batching, has many drawbacks and limitations. For example, usually large tanks are required. Since this process can be time-consuming, large-volume batches are typically prepared at the same time. This large scale requires substantial manufacturing space, creates variations between batches, and large batch volumes dictate a relatively fixed and inflexible manufacturing schedule. Large volumes are typically batched in order to overcome the relative imprecision of constituent fluid measurement. Large volumes help to reduce these errors as a percentage of the total batch quantity.

Another drawback of batching is that the batch frequently changes its rheological or chemical properties over time. This aging effect is common to many formulations and over time, and it forces many adjustments to be made prior to sending the composition to the intermediate or end user. Batching can also lead to open or partially open tanks with fluids exposed to the atmosphere. This can lead to unwanted chemical contamination, chemical degradation, or microbial contamination.

Batching can also lead to difficulties in mixing the fluid components together in large volumes. Mixing can require prolonged agitation to make a homogeneous mixture. It is common for different levels of a large tank to have different proportionate mixtures of the fluids. Large volumes typically committed to batching also cause cleaning to be slow, laborious, and difficult to automate. Large volumes of cleaning effluents are produced, leading to issues of waste and contamination.

Because of these numerous shortcomings and limitations, alternative means of fluid products manufacturing have been sought. One alternative method to batch processing is known as continuous or in-line blending. Continuous or in-line blending embodies the notion of combining constituent fluids to form a fluid product only as needed or on an on-demand basis. Essentially, the product is made on-demand and at a fixed rate required. The rate required is typically based on the demand of the fluid using processes, filling machine packaging, or overall use of the liquid product being made.

A continuous or in-line blending system can eliminate the large batch preparation and holding tanks, which leads to a small system volume, more product compounding flexibility, faster product formulation turnaround, and a substantially lower capital cost. Continuous and in-line blending can reduce waste, cleanup time, and effluent volumes. Furthermore, the mixing is simplified and results in more homogeneous formulations. The product aging effects are also largely eliminated. However, it can be challenging to build and operate a continuous or in-line blending system with the maximum degree of accuracy, flexibility of use, and versatility of application in a broad range of commercial sectors.

Numerous designs for continuous or in-line stream blending have been proposed, originating from various liquid processing industries, such as electronic, semiconductor, beverage processing, and food processing. These designs attempted to develop and market continuous in-line flow proportioning or blending systems based upon ratios using flow control devices, flow meters, and proportional-integral-derivative (PID) feedback control loops. This is a type of feedback controller whose output, a control variable, is generally based on the error between some user-defined set point and some measured process variable. Each element of the PID controller refers to a particular action taken on the error.

Proportional refers to error multiplied by a gain, K. This is an adjustable amplifier. In many systems, K is responsible for process stability. Too low and the process value (PV) can drift away. Too high and the PV can oscillate. Integral refers to the integral of error multiplied by a gain, K. In many systems, K is responsible for driving error to zero, but setting K too high invites oscillation, instability, or integrator windup or actuator saturation. Derivative refers to the rate of change of error multiplied by, K. In many systems, K is responsible for system response. Too high and the PV will oscillate. Too low and the PV will respond sluggishly. Derivative action can amplify any noise in the error signal.

In general, these designs rely on regulating a continuous flow of the liquid streams using variable orifice valves or speed controlled pumps. A flow rate signal from a flow meter, most often a Coriolis mass flow meter or metrology, is used to proportionately modulate the flow control device in order to attempt to maintain a desired ratio of flows among the streams. Another signal represents overall system demand rate and can be used to proportionately modulate the summed flow of the entire system.

Several major design problems are encountered with continuous or in-line blending systems using this architecture. First, as the overall output of the system is increased or decreased, the rate of change capability or response time constant of each stream will vary one from the next. Thus, with a varying output command signal, each stream reacts at a different rate causing loss of ratio flow. This is further aggravated by the overshoot or undershoot of each stream as a new set point is reached. As each stream flow rate changes, it can perturb the flow rate of the other stream or streams causing hunting or oscillations. These common control problems can cause serious loss of blended stream accuracy. PID loop controllers are designed to control complex systems that are not inherently designed for stability or ease of control. PID loop controllers deal with the interacting, multiple dependent and independent variables of a flow stream, in a non-real time, statistical way and fight changing parameters on an historical basis.

Another problem can arise when a feedback signal change causes the flow to briefly go below or above the permissible range of the flow meter generating the feedback signal. This can occur even with software or hardware safeties. Maintaining flow through a Coriolis mass flow meter or other flow monitoring devices within a defined range may be needed to achieve satisfactory accuracy.

Another problem encountered with these designs and the PID control architecture arises with the need to start and stop the processes or the major flow streams of the system. When a stop-start event occurs, it is difficult to bring the system back on-line with balanced and accurate flow, metrology stability, and overall in-specification blending. This problem has been so persistent that nearly all installed systems have resorted to the use of a surge tanks, or intermediate vessels of up to several hundred gallons capacity, to allow blending flow to continue during processing and machine stoppages.

Even with the use of a surge tank and intermediate vessels, if blending flow must stop, upon re-start the flow streams must either be diverted to drain until correct flow rates or metrology response are reestablished because of a prolonged pause or stoppage. Otherwise, the surge tank or vessels must be large to allow wrong unmatched flow ratios to be statistically "diluted" to prevent loss of accurate blending. Either method results in substantial waste, decreased blending accuracy, increased system complexity, and increased system volume, thus depleting the sought after advantages of continuous or in-line blending.

Additionally the applications described above are based on fixed incoming flow rates, pressures, temperatures, and concentration of specific materials to achieve specific blend concentrations at a known flowrate. Thus, these systems are designed for a fixed flowrate or overall rate in production.

Therefore, there is a need in the industries for an in-line blending system and operation techniques that address weaknesses of above-mentioned technologies.

BRIEF SUMMARY OF THE DISCLOSURE

Embodiments disclosed herein can accommodate on-demand dynamic change in flow rates by the end users or points of use while maintaining a precise blend accuracy. Embodiments of the blending system can produce mixtures and supply them to multiple end users or points of use at variable on-demand or changing production rates while maintaining a high-resolution blend accuracy at independent control points. The blending system can correct a blended product that may have been temporarily stored in a tank, vessel, or supply line prior to delivery to or on route to the end user or to single or multiple points of use. The blending system can have an ability to track and confirm the chemical compositions of the initial system's entering chemical components, the associated intermediate blends, and the various final mixture blends while the systems output production rate varies from, for example, 0.0 liter per minute (lpm) flow volume, while stepping up to various changing flow rates as different users turn on and off the blend solution usages. Such system by example can move, for example, from 0.0 lpm to 1.0 lpm to 2.0 lpm and various other increasing volumes until a maximum design value is reached. Maximum rate may be based upon the flow control devices physical limits. The blending system can provide blended products without the need for fixed volumes in storage vessels or point of use blended product supply flows with little to no waste generated at startup or rinse process cycles. The blending system can define each incoming material's composition with in-line metrology and feed this information forward for blend control. This feed forward information can be used to achieve an in-line blend accurately with use of proportional flow control (PFC) and metrology that is feeding back information for blend control, which validates a mixture when demanded with real-time active calculation of mass balance for control of the overall system mixtures being produced. This can verify the mixture in-line at all times with metrology and control the process on-demand.

A blending system for maintaining a mixture at a desired concentration is provided in a first embodiment. The blending system comprises a first species input that provides a first species; a second species input that provides a second species; a blending unit in fluid communication with the first species input, the second species input, and an output that is in fluid communication with at least one point of use; a first metrology system configured to measure a concentration of the first species in the first species input; a second metrology system configured to measure a concentration of the second species in the second species input; and a controller in electronic communication with the blending unit, the first metrology system and second metrology system. The blending unit is configured to blend the first species and the second species thereby forming a mixture. The controller is configured to determine a mass balance to maintain the concentration in the mixture within 1% of a concentration range using information from the first metrology system, the second metrology system, and a flow in the output to the at least one point of use. The controller is also configured to maintain a concentration in the mixture within 1% of the concentration range by controlling a flow rate for at least one of the first species or the second species to the blending unit based on the mass balance.

The blending system can further include a first species source in fluid communication with the first species input and a second species source in fluid communication with the second species input. The first species source provides the first species. The second species source provides the second species.

The blending system can further include an output metrology system in the blending unit. The output metrology system can configured to measure the concentration in the mixture upstream of the point of use. The output metrology system can be in electronic communication with the controller. The controller can use information from the output metrology system to determine the mass balance.

The blending system can include a plurality of the points of use each having one of a plurality of the outputs.

The controller can be further configured to receive information related to a demand rate at the point of use and increase a flow rate of the mixture from the blending unit to the point of use while maintaining the concentration within 1% of the concentration range.

The controller can be further configured to receive information related to a demand rate at the point of use and decrease a flow rate of the mixture from the blending unit to the point of use while maintaining the concentration within 1% of the concentration range.

The blending unit can be configured to achieve a homogenous solution of the mixture at less than 99% of a maximum designed flow rate for the system.

The blending unit can include an input flow path; an output flow path; a chemical injection nozzle proximate the input flow path; a directional flow perforated plate downstream of the input flow path and the chemical injection nozzle; a homogenizing turbulence mix zone void disposed downstream of the input flow path and the chemical injection nozzle and upstream of the directional flow perforated plate; a flow directional cone disposed downstream of the input flow path and the chemical injection nozzle and upstream of the homogenizing turbulence mix zone void; a first mixing zone flow directional cone disposed downstream of the homogenizing turbulence mix zone void and upstream the directional flow perforated plate; and a turbulence break void disposed between the directional flow perforated plate and the output flow path. The chemical injection nozzle can include an insertable injection nozzle.

The blending system can further include a directional valve in fluid communication with the blending unit. The controller can be in electronic communication with the directional valve. The controller can be configured to control the directional valve to circulate or drain the mixture in the blending unit. The blending system can further include a heater, a pressure control, and a pump in fluid communication with the blending unit between the blending unit and the output.

The blending system can be configured to provide the mixture to the output at a plurality of flow rates sequentially over a period of time. The concentration in the mixture can be within 1% of the concentration range for the plurality of flow rates.

The controller can be configured to control the blending unit and a flow rate of the mixture to the output such that a first species in the mixture from the first species input is maintained within a range of approximately 0.01% to approximately 0.1% of the concentration range and such that a second species in the mixture from the second species input is maintained within a range of approximately 0.01% to approximately 0.1% of the concentration range.

The blending system can further include a third species input in fluid communication with the blending unit and a third metrology system in electronic communication with the controller. The third species input provides a third species for the mixture. The third metrology system can be configured to measure a concentration of the third species in the third species input. The concentration of the third species can be used in the mass balance.

The blending system can further include an ultra-pure water input in fluid communication with the blending unit.

The point of use may be a semiconductor processing tool.

A method of providing blended mixture to a point of use is provided in a second embodiment. The method comprising providing a flow of a first species to a blending unit; providing a flow of a second species to the blending unit; blending the first species and the second species in the blending unit to produce a mixture; distributing the mixture to a point of use via an output in fluid communication with the blending unit; measuring a concentration of the first species in the flow of the first species with a first metrology system; measuring a concentration of the second species in the flow of the second species with a second metrology system; and maintaining, using a controller in electronic communication with the first metrology system and second metrology system, a concentration in the mixture within 1% of a concentration range based on a mass balance. The maintaining includes determining the mass balance to maintain the concentration in the mixture within 1% of the concentration range using information from the first metrology system, the second metrology system, and a flow in the output to the at least one point of use.

The blending unit can deliver the mixture on-demand to the point of use.

The maintaining can include, using the controller, changing a flow rate of the flow of the first species or a flow rate of the second species.

The maintaining can include, using the controller, increasing a flow of the mixture when the concentration in the mixture is outside the concentration range.

Increasing the flow can include opening a drain valve in fluid communication with the blending unit.

The method can further include measuring the concentration in the mixture upstream of the point of use with an output metrology system. Information from the output metrology system can be used to determine the mass balance.

Determining the mass balance to maintain the concentration in the mixture can use information about concentration of the mixture from the point of use.

The method can further include increasing at least one of the flow of the first species or the second species when the concentration in the mixture is outside the concentration range.

The method can further include decreasing at least one of the flow of the first species or the second species when the concentration in the mixture is outside the concentration range.

The system can be configured to provide the mixture to the point of use at a plurality of flow rates sequentially over a period of time. The concentration in the mixture can be within 1% of the concentration range for the plurality of flow rates.

Each of the plurality of flow rates can be from 1 liter per minute to 20 liters per minute.

Distributing the mixture can be to a plurality of the points of use.

Maintaining can include compensating for decomposition of the first species or the second species in the blending unit.

The method can further include providing a flow of a third species to the blending unit and measuring a concentration of the third species in the flow of the third species with a third metrology system that is in electronic communication with the controller. Determining the mass balance can use the concentration of the third species from the third metrology system. The third species may decompose at least one of the first species or the second species in the mixture.

The method can further include providing a flow of ultra-pure water to the blending unit.

The first species and the second species may be each an aqueous acid, base, solvent, salt, or slurry.

DESCRIPTION OF THE DRAWINGS

For a fuller understanding of the nature and objects of the disclosure, reference should be made to the following detailed description taken in conjunction with the accompanying drawings, in which:

FIGS. 9A-9C illustrate an embodiment of a blending/mixing point according to the present disclosure;

FIGS. 10A-10E illustrate an embodiment of an injection nozzle that can be used in the blending/mixing point of FIG. 9;

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Systems and methods for on-demand in-line-blending and supply of chemicals are disclosed. Methods of the present disclosure include an in-line active and reverse calculating mass balance blending system, which maintains a chemical at desired control points, such as with respect to concentration, temperature, and/or pressure, while the output flow rate changes dynamically to the point of use. Embodiments disclosed herein include a blending unit configured to receive and blend at least two chemicals and deliver a mixture, at selected concentrations to points of use. The blending system can further include a controller configured to maintain at least one mixture within a selected concentration range within the chemical formed. The controller controls at least one operation of the blending unit to maintain the concentration of the mixture within a selected concentration range, such as at one or more points of use. The operation can be continuous and can maintain the concentration of the mixture at all times during operation. A change in flow rate of the inputs and outputs of the blending system can be detected. When flow changes, the blending system can actively calculate the mass balance required to maintain concentration of the mixture at a new flowrate while maintaining within the chemical target range.

The mass balance can be specified at the design phase when the mass balance, also called a material balance, is the application of conservation of mass to design the physical systems. Therefore, mass balances are used in engineering to design chemical systems. By accounting for material entering and leaving a system in total mass, their flows are identified to select what components are used to achieve blended product at a specified or given production rate. These production rates are typically fixed in volume when producing the blended solutions to the feed, filler, or using process points. Process points can be known as points of use.

Figure 1:
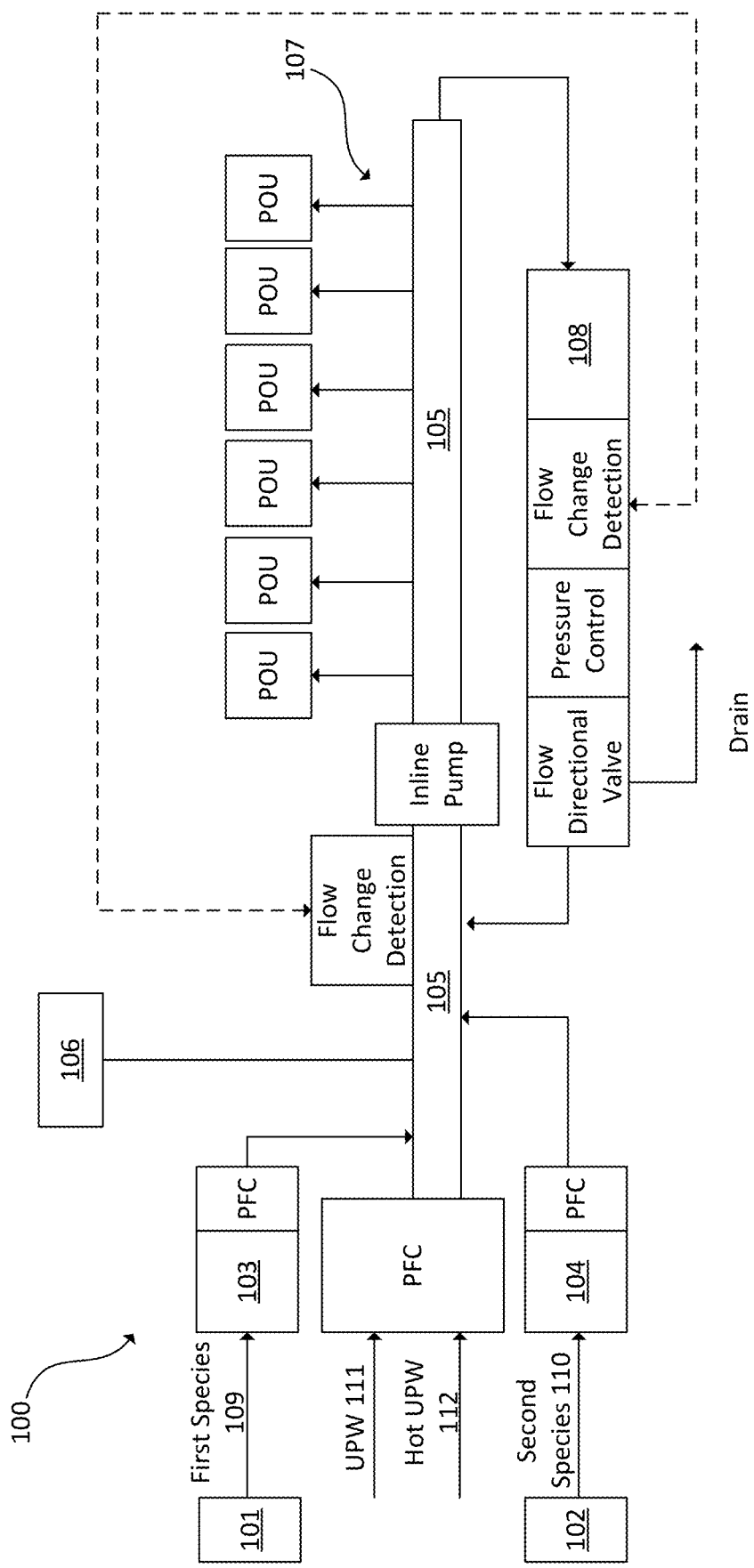
FIG. 1 is a block diagram illustrating an embodiment of an on-demand, in-line blending system with a circulation loop to blend to temperature according to the present disclosure.
Figure 2:
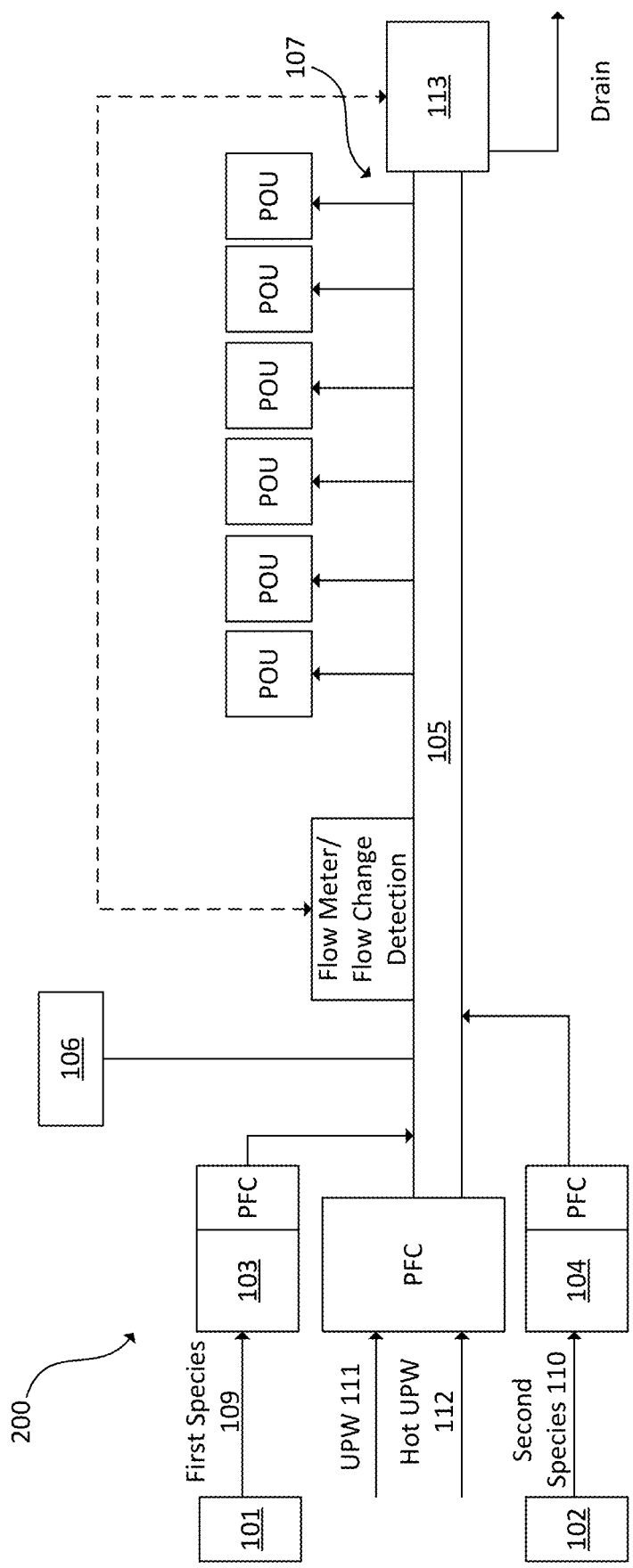
FIG. 2 is a block diagram illustrating another embodiment of an on-demand, in-line blending system according to the present disclosure.

As shown generally in FIGS. 1 and 2, systems according to the present disclosure define each incoming material's composition with in-line metrology and feed the measured composition parameters forward for control. In-line blend accuracy can use PFC and metrology feedback downstream for control. Validation of the mixture can be accomplished with real-time active calculation of mass balance for enhanced control. The in-line mixture composition can be ensured with metrology and control of the process in the on-demand system. FIG. 1 illustrates a blending system 100 including a circulation loop to facilitate blending to specific temperature points. FIG. 2 shows an alternative embodiment of a blending system 200 without a circulation loop. The optional process control 113 for the blending unit 105 may include an output metrology system for the mixture in the blending unit 105.

Embodiments of the blending system 100 can maintain a mixture at a desired concentration. The blending system 100 can include a first species input 109 that provides a first species and a second species input 110 that provides a second species. The first species input 109 and second species input 110 can be a pipe or tube. The first species and second species may be different. The blending system 100 also can optionally include an ultrapure water (UPW) input 111, hot UPW input 112, and/or other inputs.

A first species source 101 can be in fluid communication with the first species input 109 to provide the first species. A second species source 102 can be in fluid communication with the second species input 110 to provide the second species. The first species source 101 and second species source 102 may be, for example, a tank, reservoir, or container.

The first species source 101 and second species source 102 can deliver the first and second species to the blending unit 105. One or more pumps may be used to transfer the first species and/or second species to the blending unit 105. The controller 106 is configured to control delivery of the first species and the second species at selected concentrations and at varying flow rates to the blending unit 105 such that the blending unit 105 provides the mixture to the point of use at a desired flow rate while maintaining first species within a concentration range and/or the second species within a second concentration range of the mixture delivered to the point of use. Valves can be used to control delivery of the first species and the second species.

The blending unit 105 can include a flow change detection units and an inline pump. The PFCs can be used to provide in-line blend accuracy using feedback from the metrology in the blending system 100. The blending unit 105 can provide an in-specification blend, which can include real-time validation. The blending unit also can provide optional heating, such as using a resistance heater, boiler, or other heating system.

In an embodiment, the blending system 100 can include a third species input (not illustrated) in fluid communication with the blending unit 105. The third species input provides a third species for the mixture. The third species input may be in fluid communication with a third species source. The third species may be different from the first species and/or the second species. While a third species input and third species are disclosed, more than three species inputs or species can be used. The first species, second species, and third species are typically not pure water, though each may contain water in a solution or mixture.

In an instance, the third species can decompose at least one of the other species in the mixture that is being provided to the points of use. For example, a peroxide can decompose during transport or storage.

The first species, second species, or other species can be fluids. These fluids can be solutions, aqueous chemicals, liquids, or gases. In another instance, the chemical input can be a powder, which can be transported as a powder or with a liquid or gel.

A blending unit 105 can be in fluid communication with at least one of the first species input 109 or the second species input 110. The blending unit 105 also can be in fluid communication with an output 107 that is in fluid communication with one or more point of use. For example, there may two or more points of use. Each of the points of use can have one of the outputs 107 or points of use can share an output 107. In an instance, the point of use is a semiconductor processing tool. The blending system 100 may be in substantially close proximity to the semiconductor process tool. Other points of use are possible and this is only one example.

The blending unit 105 is configured to blend at least one of the first species or the second species thereby forming a mixture. The blending unit 105 can be configured to receive and blend at least two species and deliver a mixture at selected concentrations to at least one point of use that requires a demanded volume of the mixture. The blending unit 105 also can adjust the temperature or pressure of the mixture, such as with heaters or pumps. Differences in temperature or pressure of the mixture from a desired range or value also can be determined and compensated for.

A first metrology system 103 can be configured to measure a concentration of the first species in the first species input 109. A second metrology system 104 can be configured to measure a concentration of the second species in the second species input 110. The metrology systems can include inductively coupled conductivity or refractive index sensors to detect the concentration in the inputs.

A controller 106 can be in electronic communication with the blending unit 105, the first metrology system 103, and the second metrology system 104. The blending unit 105 on demand delivers the mixture to the point of use during system operation. The controller 106 can define the incoming material composition using defined information to continually and/or actively determine the mass balance required, achieve the desired mixture, validate the mixture by maintaining the required mass balance, and ensure with in-line active metrology and feedback. The controller 106 can be configured to determine a mass balance to maintain the concentration or concentrations in the mixture within 1% of a concentration range or ranges using information from the first metrology system 103, the second metrology system 104, and a flow in the output 107 or outputs 107 to the at least one point of use. The controller 106 also can be configured to maintain a concentration or concentrations in the mixture within 1% of the concentration range or ranges by controlling a flow rate for at least one of the first species or the second species to the blending unit 105. Thus, a flow rate of solution into and/or out of the blending system 100 changes when the concentration range changes.

The controller 106 can determine the mass balance by subtracting any outputs to the points of use and any consumption within the system from a sum of the inputs to the system and any generation within the system. There may be accumulation within the system (i.e., mass buildup) if some of the mixture is contained in the blending unit 105. While accumulation may occur, accumulation also may be minimized or may be zero. The determination may be made every 10-100 ms using metrology readings with the various flowrates. A material balance can account for material for the blending system 100 derived at a specific concentration while at a desired flow rate and including a total volume used. The blending system 100 configuration and quantities of interest (e.g., mass of a component, total mass, moles of an atomic species, etc.) can be defined. The mass balance can use information about the flow rates of the inputs and concentrations of the inputs and the outputs.

In an instance, a volume of the blending unit 105, a volume of the output 107, and a concentration of the desired mixture are known. The outgoing flowrate to the point of use is determined. The concentration of first species and second species in the mixture can be determined and the flowrates in the first species input 109 and/or second species input 110 can be adjusted. This can use a PID equation. The blending unit 105 can determine that mixture is being used at one or more of the points of use. Flow rates can be determined by, for example, a flow meter or a position of valves in the blending system 100. For example, a stepper motor position of a valve can be used to determine flow rate if the valve size and dimensions are known. Thus, if the valve opening position using the stepper motor is known, then the flow rate through the valve is known.

In the embodiments disclosed herein, there can be multiple PIDs running in concert. These PIDs can include feedback control from single PVs or feed-forward plus feedback that incorporate multiple PVs. The PIDs can be used to set a bias starting position on the flow control valves. Cascading and/or cascading with feedback can be used.

Changes can be detected and managed by adjusting the flow control devices to maintain the desired flow, pressures, and/or concentration.

An example mixture includes a solvent with UPW (76.16% wt), inhibitor (0.66% wt), oxidizer (0.33% wt), acid (4.31% wt), base (2.83% wt), and suspended solid (15.71% wt). FIGS. 12-17 illustrate different flow rates, POU volume, and valve conditions to maintain the concentration ranges in the mixture using a mass balance.

Temperature of the first species and/or second species can be monitored when determining concentration in the first species input 109 and/or second species input 110. Temperature can affect conductivity of the first species and/or second species, so differences in temperature can be compensated for.

The flow rate can be controlled by adjusting one or more of the valves in the blending system 100, such as in a PFC or outputs 107. Optional booster pumps also can be used in the first species input 109 and/or second species input 110.

In an embodiment, the blending system 100 can follow usage at the points of use. Thus, the blending system 100 may match operation at the points of use. Flow of the mixture to the points of use may match usage at the points of use. This can be particularly helpful with mixtures that decompose or have a short shelf-life.

Embodiments of the blending system 100 can be based on preloaded conditions. For example, at start-up there can be preloaded conditions such as incoming supply component pressures and assay values. Thus, the proportional control valve positions can be determined and when the air-operated valve opens in a blend sequence can be determined. Additionally, loaded forward and back pressure regulating devices can be used during operation. The instruments in the blending system 100 can be set up with zero averaging employed at the start of a sequence that allows readings to follow in real-time and applying averaging as the operation enters into steady state running. Thus, the components of the blending system 100 work in concert to react when the sequences start. The minimum time in response is approximately 100 ms and typical flux in flows and pressures is from 0.1 to 0.5 on the PV value.

In an instance, the controller 106 is configured to control the blending unit 105 and the flow rates of mixture to the point of use such that mixture is maintained within a range of approximately 0.01% to approximately 0.1% of a concentration target of the mixture being used at the point of use. In another instance, the controller 106 is configured to control the blending unit 105 and the flow rates of mixture to the point of use such that mixture is maintained within the concentration target of the mixture being used at the point of use.

In an instance, the controller 106 can be configured to control the blending unit 105 and a flow rate of the mixture to the output 107 such that a first species in the mixture from the first species input 109 is maintained within a range of approximately 0.01% to approximately 0.1% of the concentration range of the mixture and such that a second species in the mixture from the second species input 110 is maintained within a range of approximately 0.01% to approximately 0.1% of the concentration range of the mixture.

The concentration range of the mixture or any of the input species at the point of use can be determined by initial design requirement. For example, the concentration range may include a first species at approximately 5.0% by weight of the mixture at point of use and the second species at approximately 1.0% by weight of the mixture at point of use. This is only one example. Other concentration ranges are possible.

In an instance, the controller 106 can further be configured to control a flow rate for the UPW and/or hot UPW to maintain the concentration in the mixture.

While the first species input 109 and second species input 110 are disclosed, plural constituent feeds can include three or more species inputs. Each species input can transport a different species.

The blending system 100 can include an output metrology system 108 in the blending unit 105. The output metrology system 108 is configured to measure the concentration in the mixture upstream of the point of use. The output metrology system 108 can be in electronic communication with the controller 106. The controller 106 can use information from the output metrology system 108 to determine the mass balance.

The metrology sensors can measure, among other things, a concentration of the at least one species of the mixture being used by the point of use to provide an indication to the controller 106 when the concentration in the mixture is within the target range or outside of the range.

The controller 106 can be configured to receive information related to a demand rate at the point of use. In response, the controller 106 can send instructions to increase a flow rate of the mixture from the blending unit 105 to the point of use while maintaining the concentration within 1% of the concentration range. The controller 106 also can send instructions to decrease a flow rate of the mixture from the blending unit 105 to the point of use while maintaining the concentration within 1% of the concentration range. In another instance, the blending system 100 can maintain the concentration in the mixture within the concentration range by delivering an increased flow rate to the output 107 when the concentration is outside the concentration range.

The blending system 100 can be configured to allow an on-demand flow of mixture to move with changing rate of use demand. Flow is controlled as required up and down as one or more point of use demand rates change. The blending system 100 may be capable of moving from 0.0 lpm to any flows between and up to a designed maximum of the PFCs 106 for a given blending system 100, such as 1 lpm, 10 lpm, 20 lpm, or 40 lpm.

One or more of the aspects and embodiments of the controller 106 as described herein may be implemented using one or more machines (e.g., one or more computing devices) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any non-transitory medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory (ROM) device, a random access memory (RAM) device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms such as signal transmission.

Examples of a computing device include, but are not limited to, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. Computing devices will generally include one or more processors, memory, optionally non-volatile storage, input/output devices and/or graphical user interfaces. Computing devices may also include communication means for communication with remote, local, or wide area networks, including wireless or cloud-based communications. The computing device also can communicate with components of the blending system 100.

The blending unit 105 can be configured to achieve a homogenous solution of the mixture at less than 99% of a maximum designed flow rate for the system. For example, if the blending system 100 maximum flow is 20 liters, then 99% of it would be 19.8 liters. The blend points of the first species and the second species may be configured to achieve a homogenous solution with minimal volume and pressure loss when measured from species inlets to a blended solutions outlet with no turbulent affluent on the out flowing blended stream. In some embodiments the pressure loss is negligible or near zero even while achieving complete mixing.

The blending system 100 can include a pressure control device such as a back pressure regulator like an active pressure-controlled pipe conduit or vessel. This pressure control device can control the pressure in the blending unit 105. Incoming chemical components enter the system at pressure and are regulated down to, for example, 45 PSIG. This becomes the pressure entering in to the proportional flow control valve (PFCV). The control valve of the PFCV with the inlet and outlet pressure can set the flow rate. The blending system 100 can control the delta in pressure and maintain the needed pressure in the blend channel in the blending unit 105, which contain the two blend cells. In an example, the entering pressure to the PFCV is controlled at 45 PSIG while the pressure on the outlet is maintained at 15 PSIG. The blend cell's volume is greater than the two conduits delivering the fluid into the entrance, and the control valve is larger than the conduits so there is no pressure drop across the blend cell. There is a measured pressure change that floats or oscillates with flow when active. The cyclical oscillations are between 0.1 to 0.5 PSIG on both sides of the blend cells when measured actively In the dynamic fixed volume embodiment of FIG. 1, the blending system 100 includes a flow directional valve in fluid communication with the blending unit 105. The controller 106 is in electronic communication with the flow directional valve. The controller 106 is configured to control the flow directional valve to circulate or drain the mixture in the blending unit 105. The blending system 100 can further include a heater, a pressure control, and a pump in fluid communication with the blending unit 105 between the blending unit 105 and the output 107. The pump can change the flowrate at the point of use.

For example, the controller 106 can be configured to control manipulation of a flow directional valve to circulate or drain to maintain a concentration and/or pressure of supply. The drain can be connected at the end of a point of use common conduit. For example, the mixture can be drained when the solutions degrade in one or more control elements or decomposes in a composition.

In the static fixed volume embodiment of FIG. 2, a load cell weight or flowrate reading may be configured to match the flow at the point of use. The contents in a static fixed volume blending system 100 may be a mixture that does not generally decompose, such as an etchant.

The blending system 100 can be configured to provide the mixture to the output 107 at a plurality of flow rates sequentially over a period of time. The concentration in the mixture can be within 1% of the concentration range for the plurality of flow rates.

Flow rates may only be limited by maximum limits of the proportional flow control devices used in the blending system 100.

In an embodiment, a semiconductor processing system or similar manufacturing device that includes a semiconductor tool can have a point of use. The semiconductor tool is configured to process a semiconductor component, such as a semiconductor wafer. The semiconductor tool can be, for example, an etching tool, a chemical-mechanical planarization (CMP) tool, or other tools. The blending system 100 blends at least two species and delivers a mixture at selected concentrations to the point of use. The point of use retains or uses a selected volume of a mixture. The controller 106 is configured to maintain at least one species within a selected concentration range in the mixture at point of use. The controller 106 controls at least one operation of the blending unit 105 to maintain the concentration of the at least one species within a selected concentration range within the mixture delivered to the point of use. The controller 106 can change a flow rate of inputs into and out of the point of use when a concentration of the at least one species within the mixture at point of use is outside of a target range. Changes and adjustments in flow are based on a mass balance of inputs and outputs to maintain the concentration in the mixture.

Part of a blending unit 105 is shown in FIGS. 9A-9C. The blending subsystem 900 includes an input flow path 901, an output flow path 902, and a chemical injection nozzle 903 proximate the input flow path 901. A directional flow perforated plate 904 is downstream of the input flow path 901 and the chemical injection nozzle 903. The directional flow perforated plate 904 diffuses the flow and helps break turbulence. A homogenizing turbulence mix zone void 913 is disposed downstream of the input flow path 901 and the chemical injection nozzle 903 and upstream of the directional flow perforated plate 904. The homogenizing turbulence mix zone void 913 creates mixing by creating turbulence. A flow directional cone 910, which can force the flow to specific zones of the flow cell, is disposed downstream of the input flow path 901 and the chemical injection nozzle 903 and upstream of the homogenizing turbulence mix zone void 913. A first mixing zone flow directional cone 912 is disposed downstream the homogenizing turbulence mix zone void 913 and upstream the directional flow perforated plate 904. The first mixing zone flow directional cone 912 folds the two species together as the two species flow out of this region via a shaped hole. A turbulence break void 911 is disposed between the directional flow perforated plate 904 and the output flow path 902. The turbulence break void 911 can remove turbulent flow by a change in the control valve. The turbulence break void 911 can have a wide accumulation point that can force laminar flow. The chemical injection nozzle 903 distributes a material in the first mixing zone 909. The blending subsystem 900 further includes a first mixing zone support ring 905, a final mixing zone support ring 906, chemical supply connection port 907, turbulence mixing zone void 908, and chemical injection pipe 913. The input flow path 901 and chemical injection nozzle 903 can transport, for example, the first species, second species, third species, UPW, hot UPW, and/or other species.

FIGS. 10A-10E illustrate an embodiment of an injection nozzle that can be used in the blending subsystem 900 of FIG. 9. FIG. 10A is a perspective view. FIG. 10B is a top view of the embodiment of FIG. 10A. FIG. 10C is a cross-sectional view of the embodiment of FIG. 10B. FIGS. 10D and 10E are additional views corresponding to FIG. 10B and FIG. 10C.

The injection nozzle of FIGS. 10A-10E can be inserted into the chemical supply connection port 907 of the blending subsystem 900 of FIG. 9B. The insertable injection nozzle (or diffusion rod) can include a tube joint which includes an insertion with grip joint coupling connector of which is insertable from one horizontal side of the blending cell into one portion of a flexible tube joint body, which is coupled to the blending subsystem 900 housing. The hole or holes in the injection nozzle affect chemical velocity, which affects the mixtures. The coupling connector surface has a flat taper that allows for multipurpose sealing of the first outer surface to the secondary inner surface. This then creates a locking surface for both faces to meet in joining the blending subsystem 900 housing body to the coupling connector of the injection nozzle. The rod section is inserted through the coupling connector's inner circumference ensuring the sealing surface of the coupling connector allows for the secondary outer circumference to seal with the rod being lined up to meet the inner blending subsystem 900 folding contact point.

The injection nozzle of FIGS. 10A-10E is designed to be fully interchangeable and easily replaceable when inserted the injection nozzle into the blending subsystem 900 housing. This can provide proper fluid velocity for folding or mixing in the blending subsystem 900 housing flow path. This can provide maximum precision control of the injected chemistry into the blending unit 105, which can be done via the use of tube in which contains part of the pipe joint coupling. The design of the injection nozzle allows for customization of the insertion nozzle into the blending subsystem 900.

The disclosed blending unit 105 is configured to achieve a homogenous solution with minimal volume and pressure loss when measured from chemical inlets to blended solutions outlet, with no turbulent affluent on the out flowing blended stream. In some embodiments, volume and pressure loss is negligible or zero. One or more of the blending units 105 can be used in the blending system 100 depending on the number of points at which species are mixed.

In an example, an incoming species like HF is transported through the injection nozzle into the main flow of water to achieve 100:1 dilution of the HF. This can take 49% HF down to 0.49%.

FIGS. 3-8 illustrate various embodiments of the blending system of FIG. 1 or FIG. 2.

Figure 3:
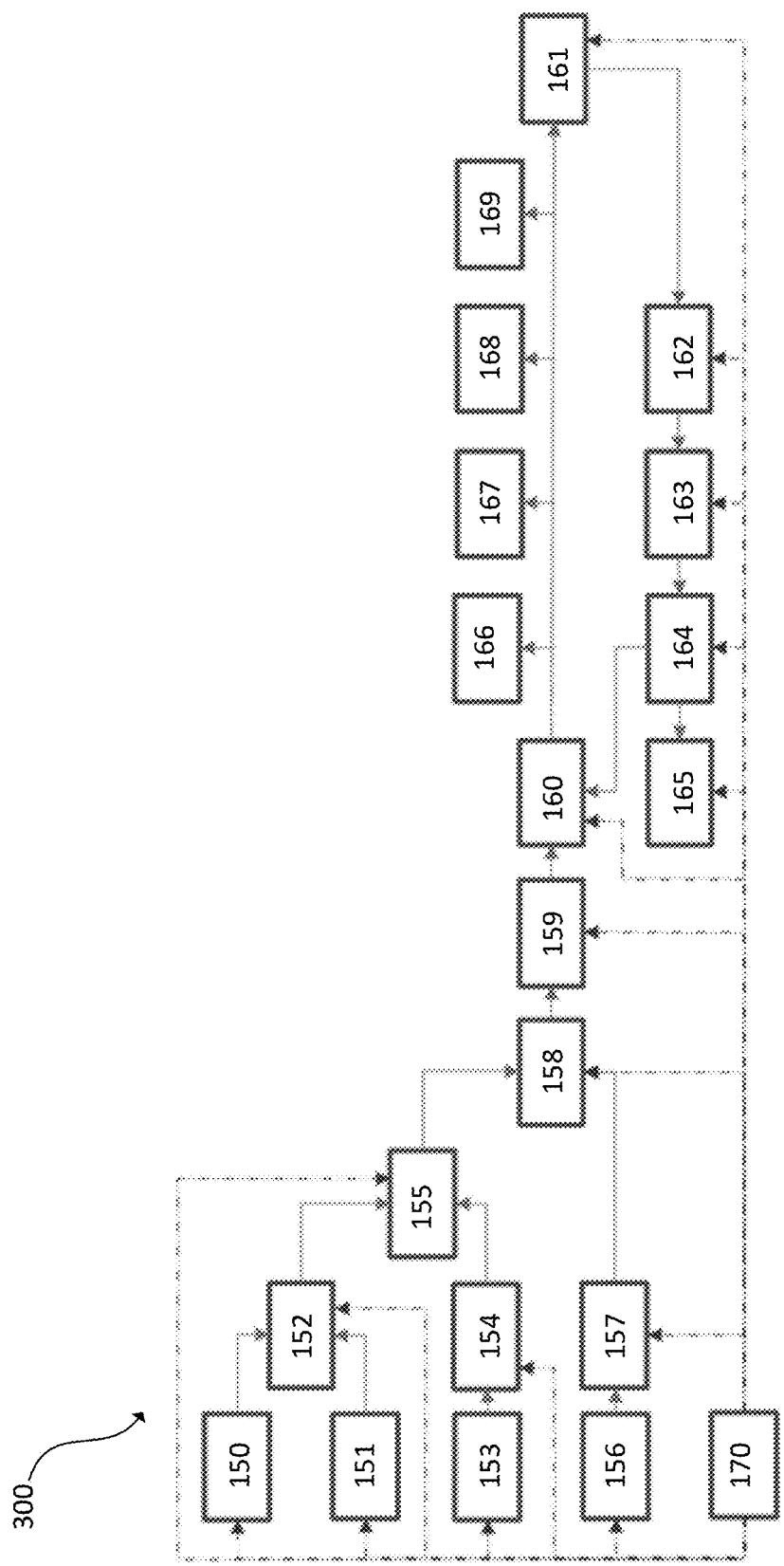
FIG. 3 is a block diagram illustrating an embodiment of a three-component, on-demand blending system with circulating volume according to the present disclosure.

FIG. 3 is a three-component on-demand blending system 300, which may include a circulating volume circuit. In this embodiment, the blending system 300 detects changes in point of use (POU) flow consumption or changes in concentrations and/or temperature and provides blended material at the rate of consumption when being used. The system and control methodology can maintain and provides blend chemical at desired temperature and concentration to the POU. Cold UPW parallel flow control (PFC) 150 (which can be cold or ambient temperature) and hot UPW PFC 151 control final blended product temperature by providing the volume of each as set point required by final blend resistance temperature detector (RTD), other sensor, or sensors 158 and 161 via the controller 170. The flow control 152 (which can include temperature or pressure monitoring with flow monitoring) mixes and controls the flow rate of UPW component of the blend solution. Feed forward control 153 can include metrology, such as inductively couple conductivity or refractive index sensors, to detect the incoming concentration and provide the measured parameters to the controller 170 for mass balance calculations, which are used to control the starting flow rate of first species. Flow control 154 controls the flow rate of first species via the PID and mass balance equations provided by the controller 170. Blending/mixing point and metrology 155 (which can include temperature or pressure monitoring with flow monitoring) receive the flow of UPW and first species and homogenizes, mixes, and measures the solution concentration and provides the information to the controller 170 for use in the PID and mass balance equation. Feed-forward metrology 156 detects the incoming concentration and provides it to the controller 170 for mass balance calculations, which are used to control the starting flow rate of second species. Flow control 157 controls the flow rate of second species via the PID and mass balance equations provided by the controller 170. Blending/mixing point and metrology 158 (which can include temperature or pressure monitoring with flow monitoring) receives the flow of UPW and second species and homogenizes, mixes, and measures the solution concentration and provides the information to the controller 170 for use in the PID and mass balance equations. In-line flow detection volume and monitor 159 and in-line pump 160 initially receive the blended material as it flows through the process conduit or piping to the POU tie-in points 166, 167, 168, 169, and through the in-line metrologies 161, with flow monitoring and change detection monitor 162, pressure control and monitor sensors 163, flow directional valve 164, to drain 165 until the line is full of in specification mixture. At this point the valve alters state to send the fluid to the inlet of pump 160 with the tie point to flow detector 159 until line full volume is indicated, at which point the blend stops.

Pump 160 circulates the solution, through the process conduit or piping to the POU tie in points 166, 167, 168, 169, and through the in-line metrologies 161, with flow monitoring and change detection monitor 162, pressure control and monitor sensors 163, flow directional valve 164 to the inlet of pump 160, with the tie point to flow sensor 159. This process continues until the one or more of the POU opens and begin using, in which case flow sensor 159 in conjunction with flow sensor 162 detects the usage with the rate of use while the blender turns on simultaneously and provides the blend at the calculated mass balance. When the POU stop taking, flow sensor 159 in conjunction with flow sensor 162 will detect the change and the blend will continue until flow sensor 159 indicates full volume, at which point the process repeats and continues. Additional in-line heat trace or in line heaters can be added to maintain loop temperature. If the material in the circulation loop degrades, directional valve 164 alters state to drain 165 until the mixture is back within the specification limits as detected by metrologies 161, at which point directional valve 164 alters state to resume the circulation through flow sensor 159 and pump 160. The process can repeat continuously in this fashion as needed on-demand.

Figure 4:
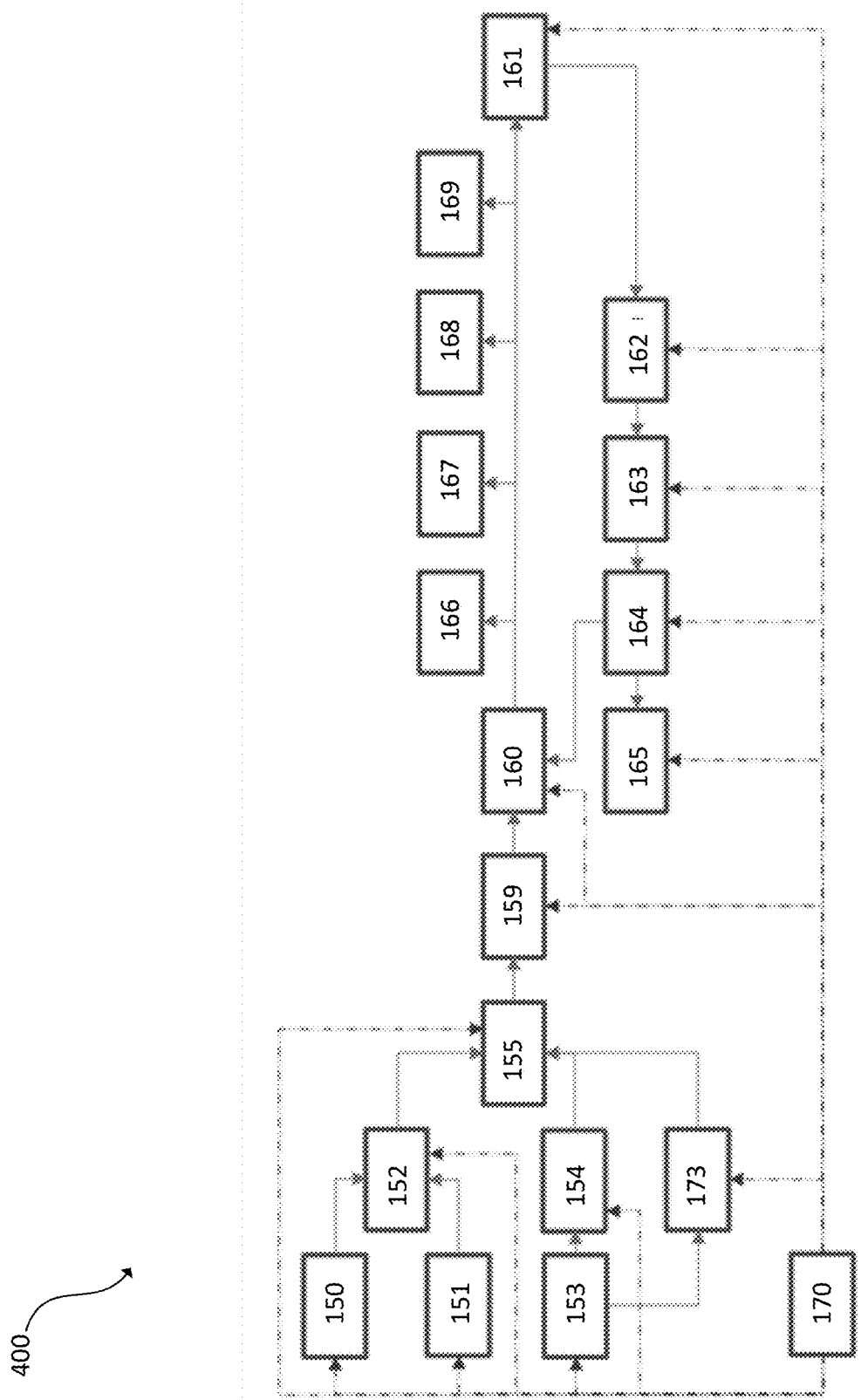
FIG. 4 is a block diagram illustrating an embodiment of a two-component, on-demand blending system with circulating volume according to the present disclosure.

FIG. 4 is a two-component, on-demand blending system 400 with a circulating volume. In this embodiment, the blending system 400 detects changes in point of use (POU) flow consumption or changes in concentrations and/or temperature and provides blended material at the rate of consumption when being used. The blending system 400 maintains and provides blend chemical at desired temperature, and concentration to the POU. Cold UPW 150 and hot UPW PFC 151 control the final blended product temperature by providing the volume of each as set point required by final blend RTD or sensor 158 and metrology 161 via the controller 170. Flow control 152 mixes and controls the flow rate of UPW component of the mixture. Feed-forward control and metrology 153 may include sensors such as inductively couple conductivity or refractive index sensors to detect the incoming concentration and provide it to the controller 170 for mass balance calculations used to control the starting flow rate of first species. Flow control 154 controls the flow rate of first species via the PID and mass balance equations provided by controller 170 when lower or higher flow is require. Flow control 173 can control flow of the first species and provide additional flow range for a higher or lower dilution ratio. Blend cell 155 and metrology receives the flow of UPW and first species and homogenizes, mixes, and measures the solution concentration and provides the information to the controller 170 for use in the PID and mass balance equation. In-line flow control 154 controls the flow rate of first species via the PID and mass balance equations provided by the controller 170. In-line flow detection volume and monitor 159 and in-line pump 160 initially receive the blended material as it flow through the process conduit or piping to the POU tie in points 166, 167, 168, 169, and through the in-line metrologies 161, with flow sensor 162 monitoring for any change in flow. Flow is also through pressure control and monitor sensors 163, flow directional valve 164 and to drain 165 until the line is full of in-specification mixture. At this point the valve alters state to send the fluid to the inlet of pump 160, with the tie point to flow sensor 159, until flow sensor 159 line full volume is indicated, at which point the blend stops.

The flow sensor 162 in FIG. 4 or other embodiments can be a flow meter. The flow sensor 162 can provide inline flow change detection and monitoring. The flow sensor 162 can be an individual unit or it can be a vessel on scales that is monitored for a rate of change. In an example, 1 kg is equal to 1 liter of a fluid with specific gravity of 1.000001. If the volume of the blending system 400 is trapped and no POU are using, then the kg value remains constant. When a POU start using at 1-liter rate, the kg changes with it. The blending system 400 volume changes and flow sensor 162 can register a change in the trapped volume and blender turns on and keeps pace with it.

Pump 160 circulates the solution, through the process conduit or piping to the POU tie in points 166, 167, 168, 169, and through the in-line metrologies 161, with flow monitoring and change detection monitor 100, pressure control and monitor sensors 163, flow directional valve 164 to the inlet of pump 160, with the tie point to flow sensor 159. This process can continue until the one or more of the POU opens and begins using. Flow sensor 159 in conjunction with flow sensor 162 detects the usage with the rate of use while the blender turns on simultaneously and provides the blend at the calculated mass balance. When the POU stops taking, flow sensor 159 in conjunction with flow sensor 162 will detect the change and the blend will continue until flow sensor 159 full volume is indicated, at which point the process repeats and continues. Additional in-line heat trace or in line heaters can be added to maintain loop temperature. If the material in the circulation loop degrades, directional valve 164 alters state to drain 165 until the solution is back within the specification limits as detected by metrologies 161. At this point directional valve 164 again alters state to resume the circulation through flow sensor 159 and pump 160. The process may repeat as described continuously as long as demand is requested by the POUs.

While specific embodiments used for illustration purposes in the disclosure have two or three input branches, any number of inputs may be used. Similarly, any number of POUs may be used. FIGS. 5-8 illustrate exemplary alternative embodiments, but do not provide an exhaustive list of all possible embodiments based on the present teachings, as will be appreciated by a person of ordinary skill.

Figure 5:
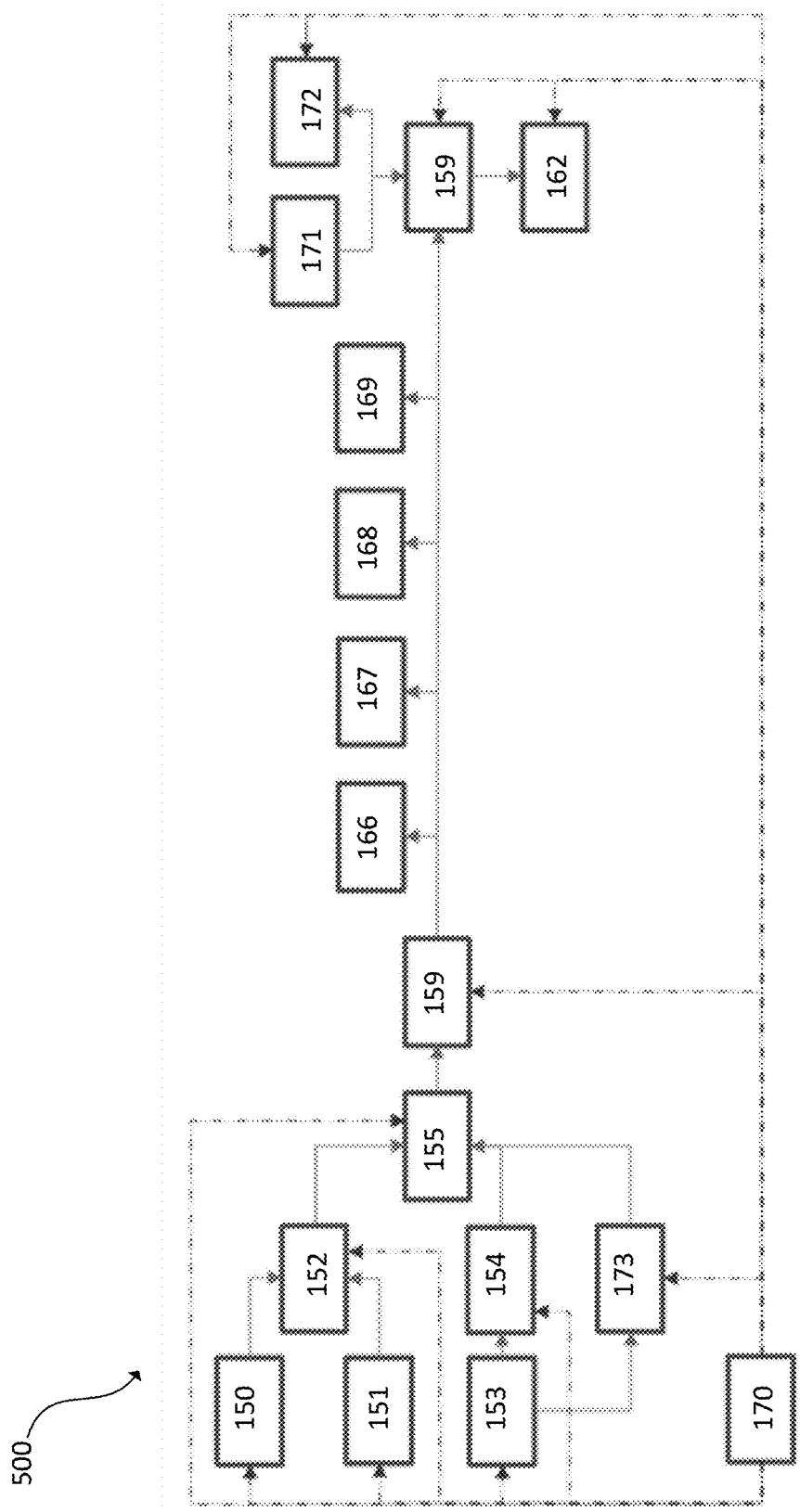
FIG. 5 is a block diagram illustrating an alternative embodiment of a two-component on-demand blending system according to the present disclosure.
Figure 6:
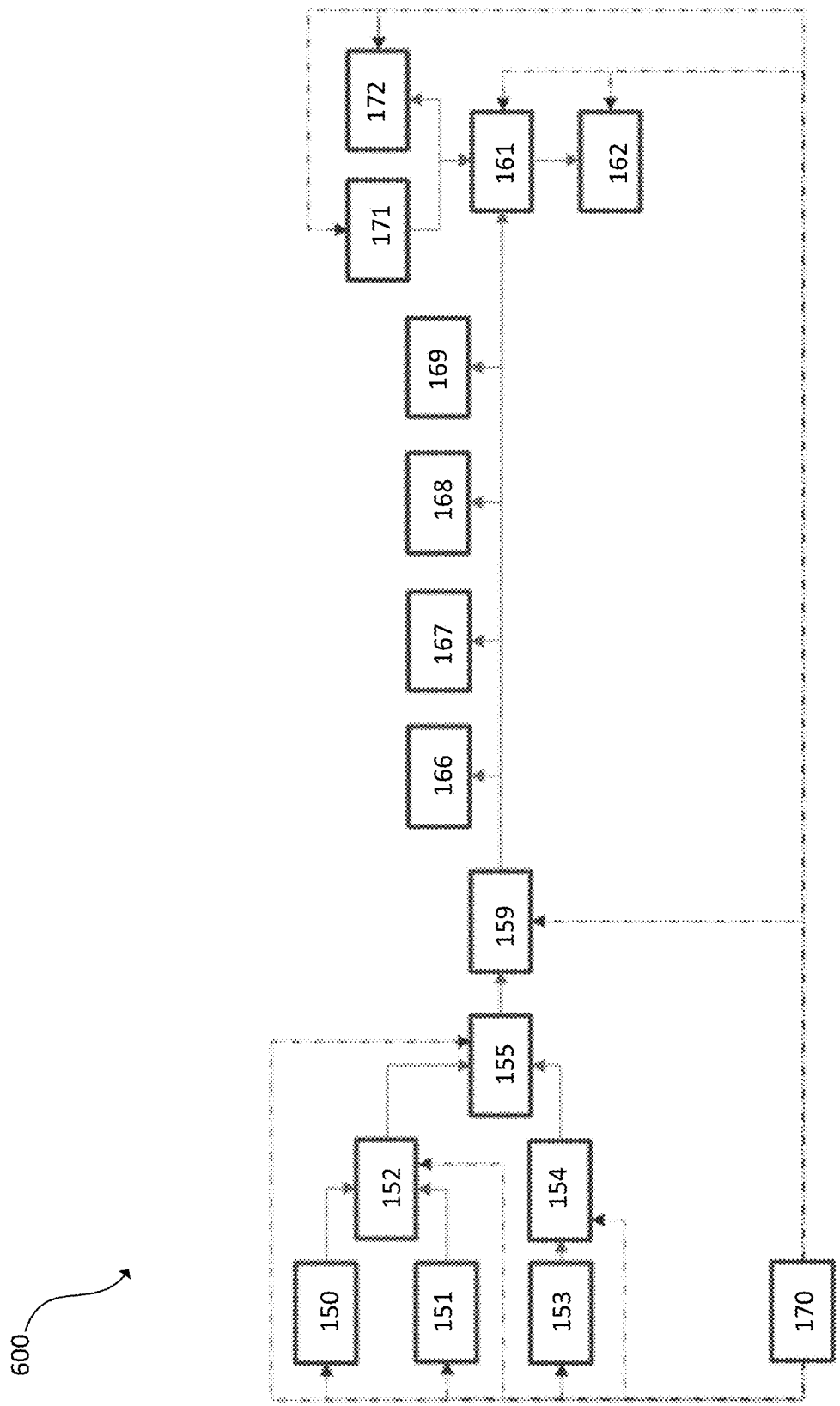
FIG. 6 is a block diagram illustrating another alternative embodiment of a two-component on-demand blending system according to the present disclosure.
Figure 7:
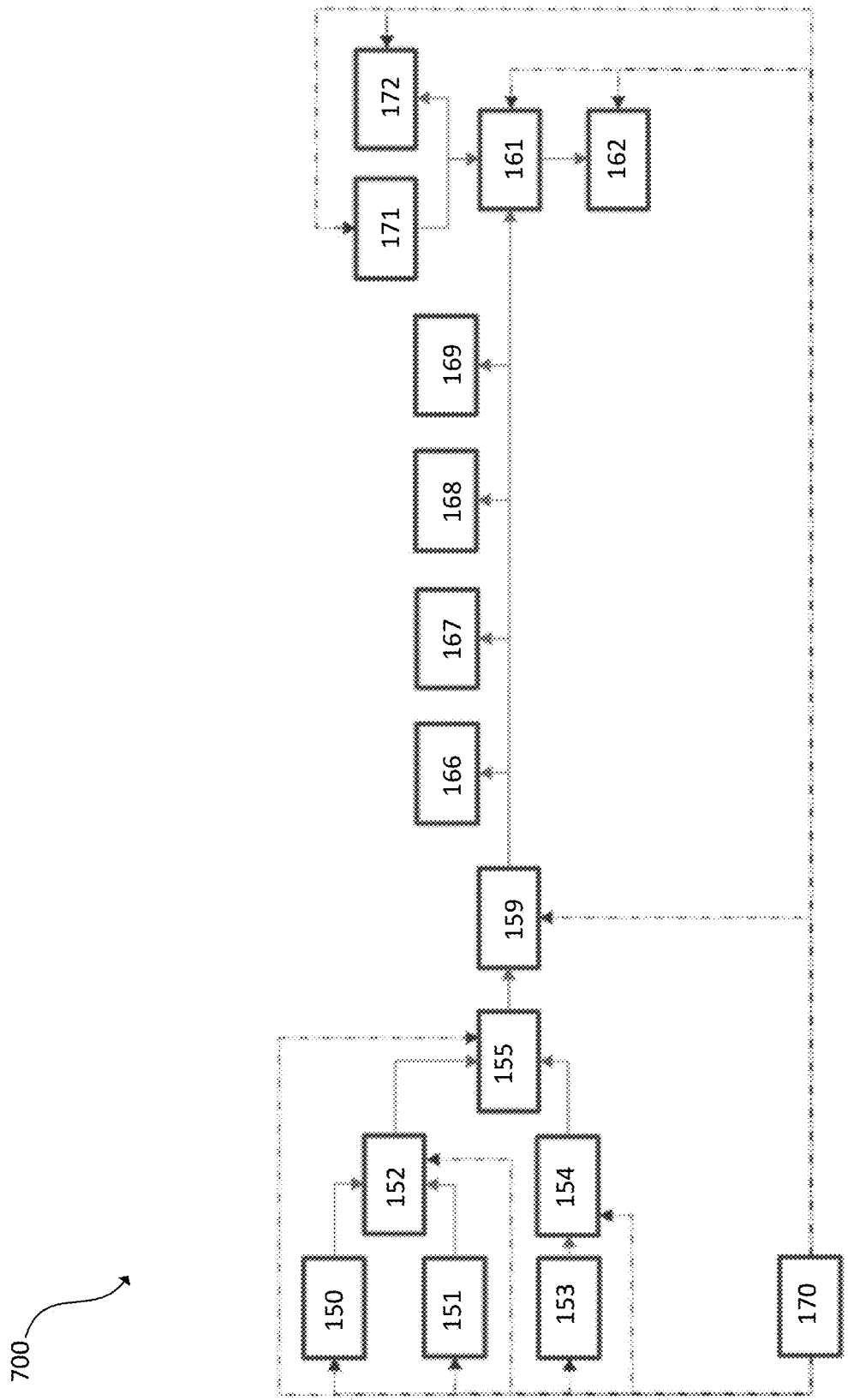
FIG. 7 is a block diagram illustrating further alternative embodiment of a two-component on-demand blending system according to the present disclosure.
Figure 8:
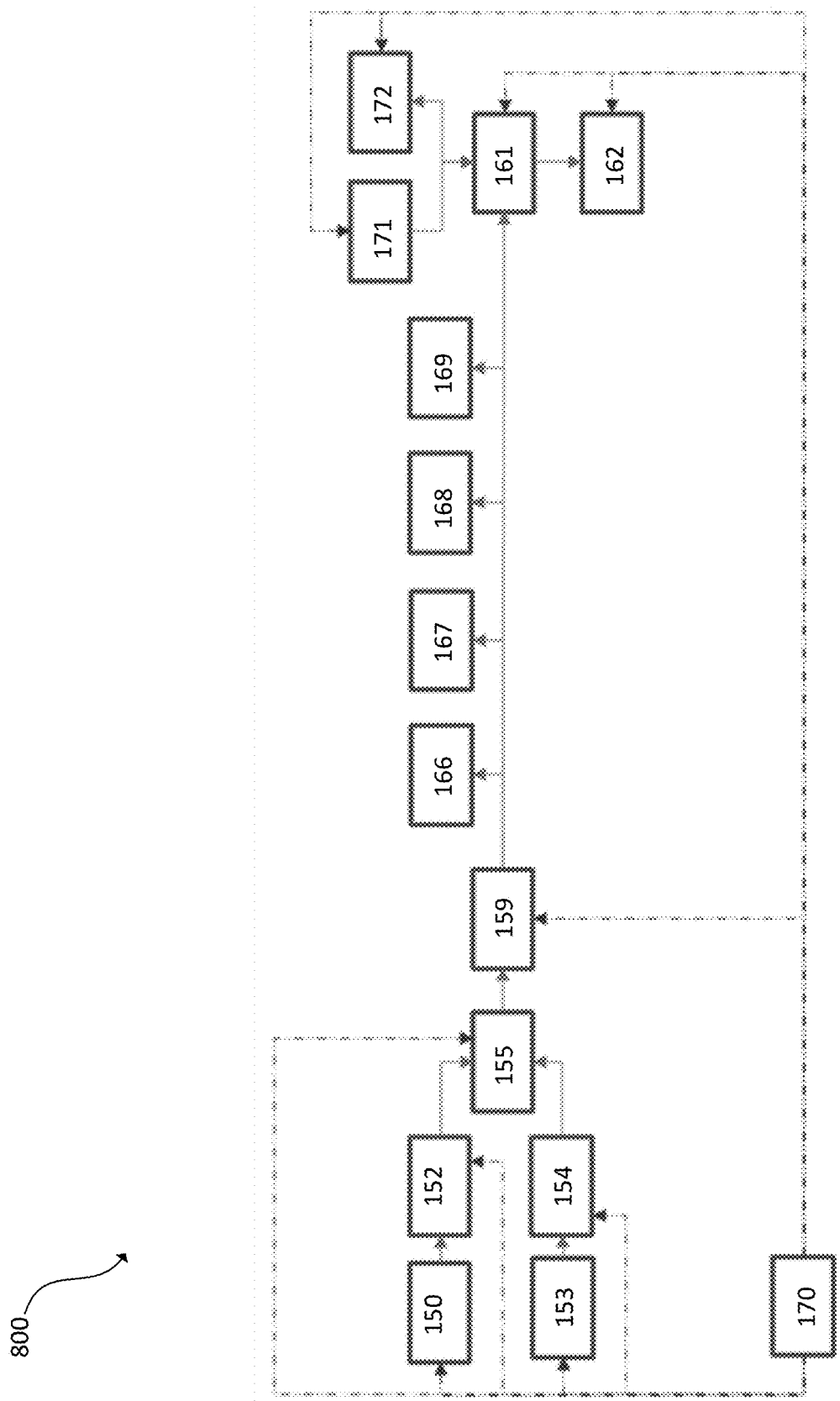
FIG. 8 is a block diagram illustrating yet another alternative embodiment of a two-component on-demand blending system according to the present disclosure.

With reference to FIG. 5, an alternative embodiment of a two-component blending system 500 with no circulating flow is shown. FIG. 5 includes a pressurizing gas 171 and exhaust 172. Individual boxes of the block diagram are connected and contain components as described above, but rearranged as shown. The same is true with respect to FIGS. 6-8. FIG. 6 shows another alternative embodiment of a two-component blending system 600, again with no circulating flow. FIG. 7 shows a further alternative embodiment of a two-component blending system 700 with no circulating flow and no additional PFC. FIG. 8 shows a further alternative embodiment of a two-component blending system 800. The embodiment of FIG. 8 has no circulating flow, no additional PFC, and no temperature blend.

Figure 11:
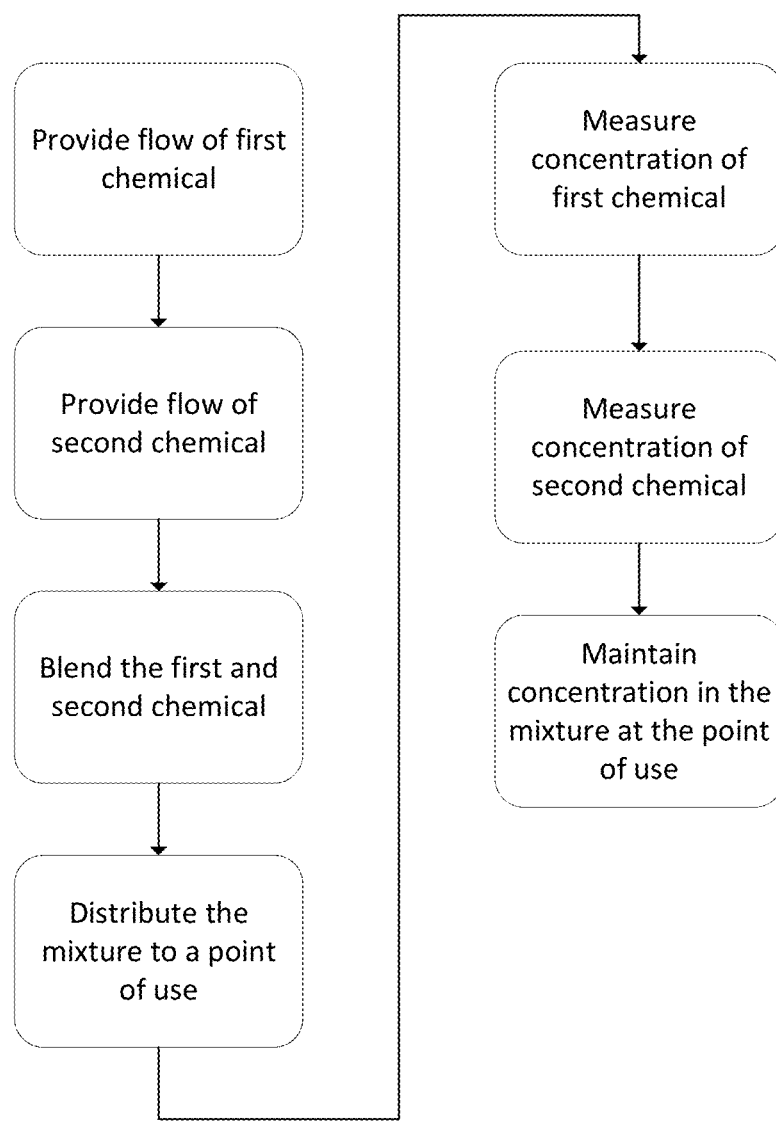
FIG. 11 is a diagram of a method according to the present disclosure.
Figure 12:
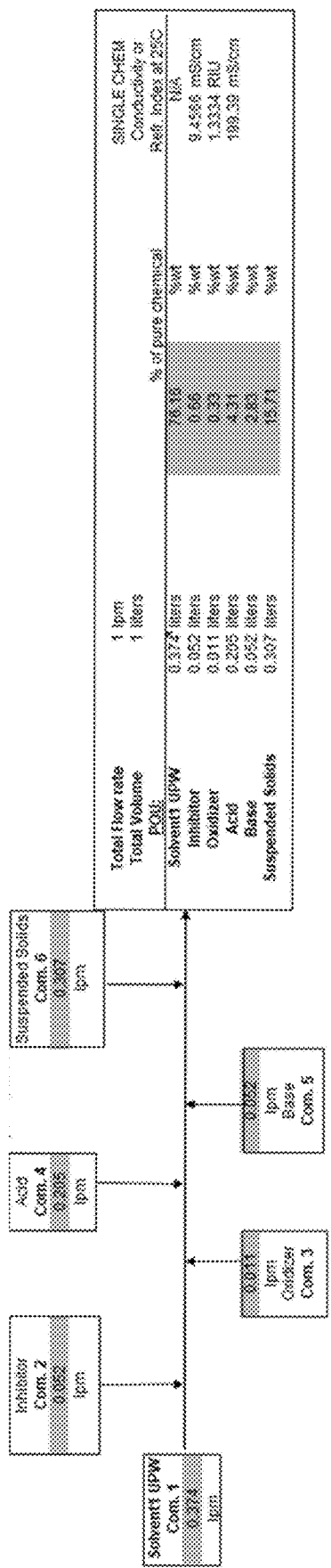
FIGS. 12-17 an example of maintaining the concentration ranges in the mixture using a mass balance.
Figure 13:
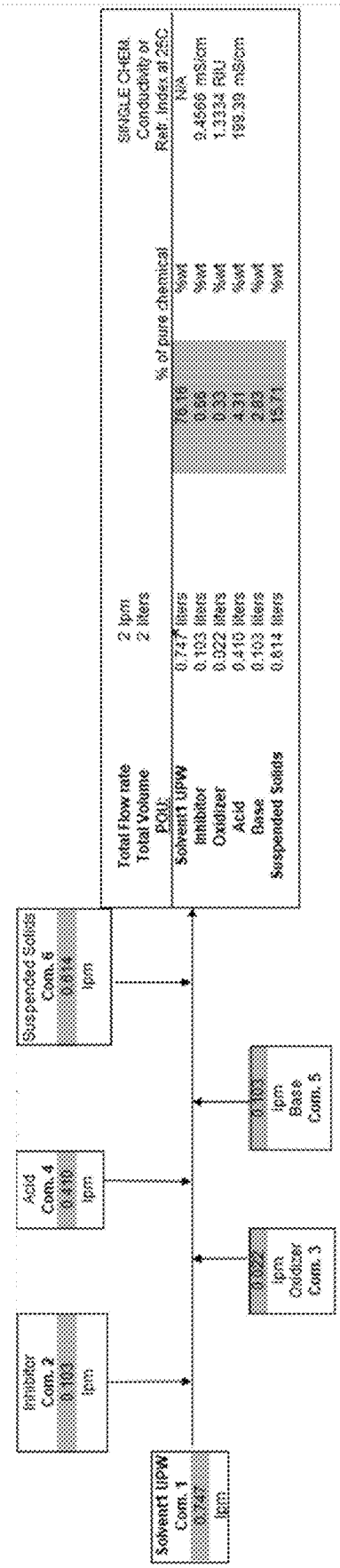
Figure 14:
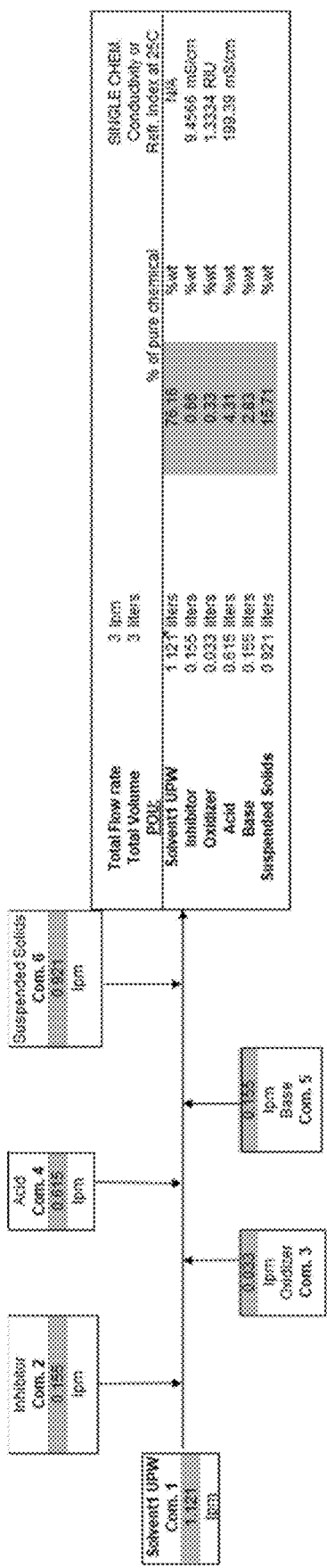
Figure 15:
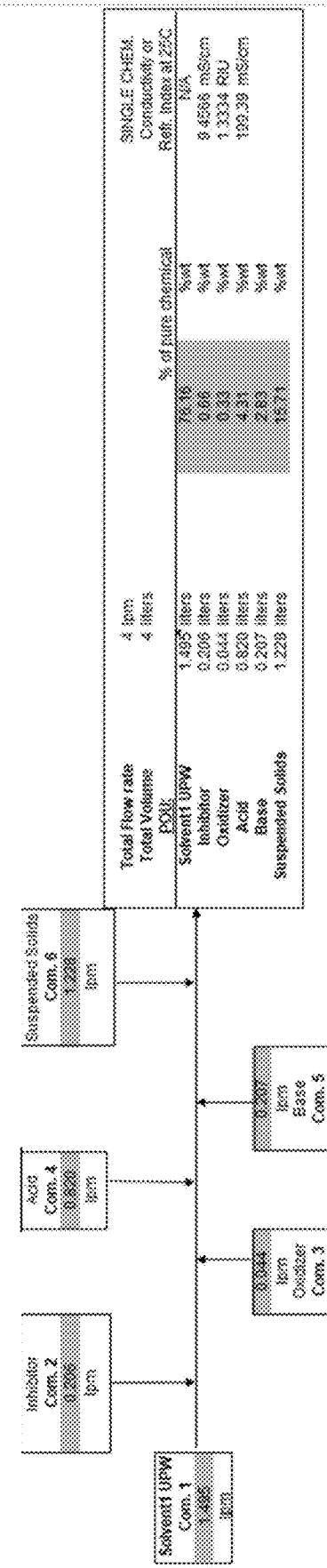
Figure 16:
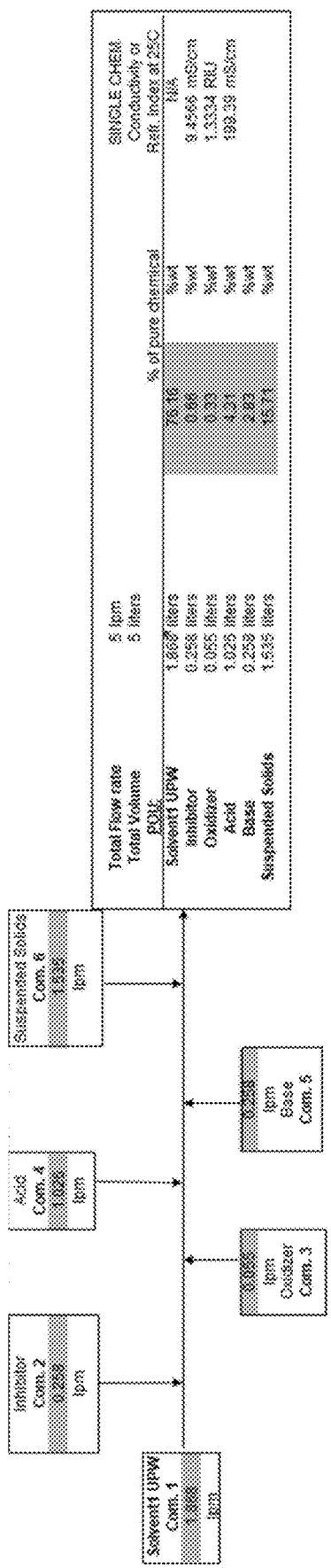
Figure 17:
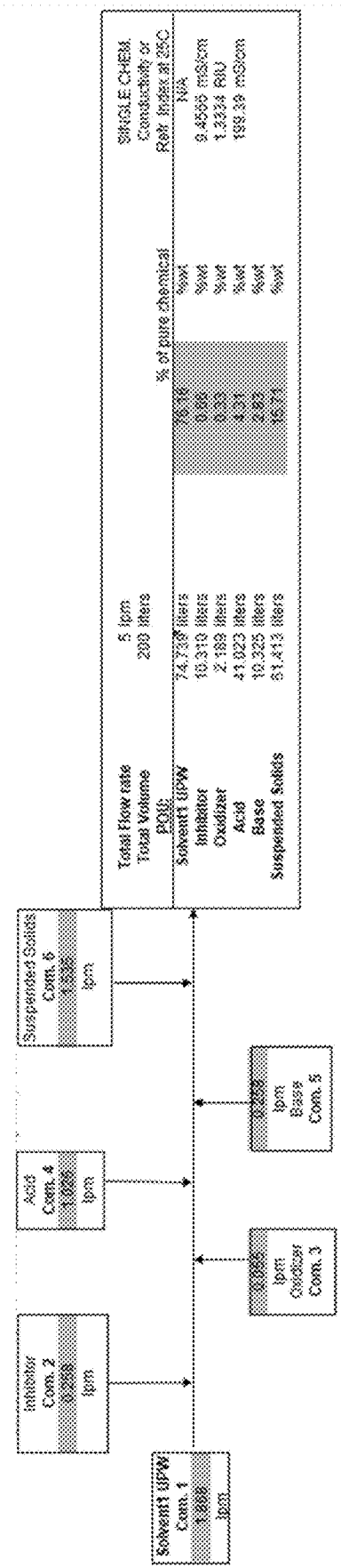

FIG. 11 is an embodiment of a method of providing a blended mixture to a point of use, such as a semiconductor processing tool. The method can be performed in any of the blending system embodiments disclosed herein. The method includes providing a flow of a first species and a second species to a blending unit. The first species and the second species can each be an aqueous acid, base, solvent, salt, or slurry. The first species and/or second species can each be in a solution. The first species and the second species are blended in the blending unit to produce a mixture. The mixture is distributed to a point of use via an output in fluid communication with the blending unit. The blending unit can deliver the mixture on-demand to the point of use. The blending unit and/or distribution unit to the point of use has a selected volume.

Some specific examples of the first species and second species include HF, tetramethylammonium hydroxide (TMAH), surfactants such as ethylene glycol (EG), $H_2SO_4$, $NH_4OH$, $NH_4F$, or slurries used for CMP.

In a particular example, the blending system mixes DPS+, which is a mix of HF, $H_2SO_4$, $H_2O_2$, and $H_2O$. It can be blended at various temperatures and concentrations. The HF may be mixed to be 0.01 wt % HF in the DPS+. The blending system can deliver HF within +/−1% relative to the target. In tests with systems using the mass balance described herein, the HF was delivered with less than 0.001% variance on a target, $H_2O_2$ was delivered with less than a 0.010% variance on target, and $H_2SO_4$ was delivered with less than a 0.012% variance on target.

The flow rate of the first species may be less than approximately 10 lpm and the flow rate of the second species may be less than approximately 20 lpm. The blending system can have maximum mixture flowrates of 10, 20, 40, 60, or 100 lpm. Sub 0.1 lpm flowrates for the mixture are also possible using the blending system. For example, flowrates of less than 3.0 mlpm have been achieved. Other flow rates are possible.

A concentration of the first species in the flow of the first species is measured with a first metrology system. A concentration of the second species in the flow of the second species is measured with a second metrology system.

Using a controller in electronic communication with the first metrology system and second metrology system, a concentration in the mixture can be maintained within 1% of a concentration range of a mixture. The maintaining includes determining a mass balance to maintain the concentration in the mixture within 1% of the concentration range using information from the first metrology system, the second metrology system, and a flow in the output to the at least one point of use. The mixture can be distributed to multiple points of use. Maintaining the concentration may be automatically performed by the controller and can operate in real-time to adjust for changes in concentration or changes in flow to the point of use. The concentration of each species in the mixture can be from 0% to less than 100% or greater than 0% to less than 100%.

The maintaining can include, using the controller, changing a flow rate of the flow of the first species or a flow rate of the second species. The method can further include increasing or decreasing at least one of the flow of the first species or the second species when the concentration in the mixture is outside the concentration range. The blending unit can maintain the concentration of the mixture within 1% of the concentration range. The concentration range can be measured at the point of use or within the blending unit and/or distribution unit to the point of use. One or more of the first species, second species, or additional species can be maintained within the 1% of the concentration range in the mixture.

The maintaining also can include, using the controller, increasing a flow of the mixture to the point of use when the concentration in the mixture is outside the concentration range. Increasing the flow can include opening a drain valve in fluid communication with the blending unit.

In an instance, the maintaining includes compensating for decomposition of the first species or the second species in the blending unit.

The method can include measuring the concentration in the mixture upstream of the point of use with an output metrology system. Information from the output metrology system can be used to determine the mass balance.

Determining the mass balance to maintain the concentration in the mixture can include using information about concentration from the point of use.

The blending system can be configured to provide the mixture to the point of use at a plurality of flow rates sequentially over a period of time. The concentration in the mixture can be within 1% of the concentration range for the plurality of flow rates. For example, each of the plurality of flow rates are from 1 liter per minute to 20 liters per minute. Other flow rates are possible.

In an instance, a flow of a third species is provided to the blending unit. A concentration of the third species in the flow of the third species is measured with a third metrology system that is in electronic communication with the controller. Determining the mass balance can use information from the third metrology system. The third species may decompose at least one of the first species or the second species in the mixture.

In an example, the target concentration of mixture at the point of use is approximately 5.5% by weight of the first species and approximately 1% by weight of the second species. Other concentrations are possible.

While disclosed with respect to semiconductor processing, embodiments disclosed herein can be applied to pharmaceutical processing, biomedical processing, food processing, beverage processing, household product processing, personal care product processing, petroleum product processing, other chemical processing, and other general industrial liquid product processing.

Various modifications and additions can be made without departing from the scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method of providing a blended mixture to a point of use comprising:
   providing a flow of a first species to a blending unit;
   providing a flow of a second species to the blending unit;
   blending the first species and the second species in the blending unit to produce a mixture;
   distributing the mixture to a point of use via an output in fluid communication with the blending unit;
   measuring a concentration of the first species in the flow of the first species with a first metrology system;
   measuring a concentration of the second species in the flow of the second species with a second metrology system; and
   maintaining, using a controller in electronic communication with the first metrology system and second metrology system, a concentration in the mixture within 0.1% of a concentration range based on a mass balance, wherein the maintaining includes determining the mass balance to maintain the concentration in the mixture within 0.1% of the concentration range using information from the first metrology system, the second metrology system, and a flow in the output to the at least one point of use.

2. The method of claim 1, wherein the blending unit delivers the mixture on-demand to the point of use.

3. The method of claim 1, wherein the maintaining includes, using the controller, changing a flow rate of the flow of the first species or a flow rate of the second species.

4. The method of claim 1, wherein the maintaining includes, using the controller, increasing a flow of the mixture when the concentration in the mixture is outside the concentration range.

5. The method of claim 4, wherein increasing the flow includes opening a drain valve in fluid communication with the blending unit.

6. The method of claim 1, further comprising measuring the concentration in the mixture upstream of the point of use with an output metrology system, wherein information from the output metrology system is used to determine the mass balance.

7. The method of claim 1, wherein determining the mass balance to maintain the concentration in the mixture includes using information about concentration of the mixture from the point of use.

8. The method of claim 1, further comprising increasing at least one of the flow of the first species or the second species when the concentration in the mixture is outside the concentration range.

9. The method of claim 1, further comprising decreasing at least one of the flow of the first species or the second species when the concentration in the mixture is outside the concentration range.

10. The method of claim 1, wherein the system is configured to provide the mixture to the point of use at a plurality of flow rates sequentially over a period of time, and wherein the concentration in the mixture is within 0.1% of the concentration range for the plurality of flow rates.

11. The method of claim 10, wherein each of the plurality of flow rates are from 1 liter per minute to 20 liters per minute.

12. The method of claim 1, wherein distributing the mixture is to a plurality of the points of use.

13. The method of claim 1, wherein the maintaining includes compensating for decomposition of the first species or the second species in the blending unit.

14. The method of claim 1, further comprising:
providing a flow of a third species to the blending unit; and
measuring a concentration of the third species in the flow of the third species with a third metrology system that is in electronic communication with the controller;
wherein determining the mass balance uses the concentration of the third species from the third metrology system.

15. The method of claim 14, wherein the third species decomposes at least one of the first species or the second species in the mixture.

16. The method of claim 1, further comprising providing a flow of ultra-pure water to the blending unit.

17. The method of claim 1, wherein the first species and the second species are each an aqueous acid, base, solvent, salt, or slurry.

18. The method of claim 1, wherein the first species and the second species are each one of HF, tetramethylammonium hydroxide, ethylene glycol, $H_2SO_4$, $NH_4OH$, $NH_4F$, or a chemical-mechanical planarization slurry.

19. The method of claim 1, wherein the point of use is a semiconductor tool.

20. The method of claim 19, wherein the semiconductor tool is an etching tool or a chemical-mechanical planarization tool.

* * * * *